United States Patent
Bjorstrom et al.

(10) Patent No.: US 9,042,054 B2
(45) Date of Patent: May 26, 2015

(54) CO-LOCATED GIMBAL-BASED DUAL STAGE ACTUATION DISK DRIVE SUSPENSIONS WITH OFFSET MOTORS

(71) Applicant: Hutchinson Technology Incorporated, Hutchinson, MN (US)

(72) Inventors: Jacob D. Bjorstrom, Hutchinson, MN (US); Mark A. Miller, Darwin, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 14/215,663

(22) Filed: Mar. 17, 2014

(65) Prior Publication Data
US 2015/0055254 A1 Feb. 26, 2015

Related U.S. Application Data (63) Continuation of application No. 13/972,137, filed on Aug. 21, 2013, now Pat. No. 8,675,314.

(51) Int. Cl.
G11B 5/55 (2006.01)
G11B 5/48 (2006.01)

(52) U.S. Cl.
CPC .............. *G11B 5/482* (2013.01); *G11B 5/5552* (2013.01)

(58) Field of Classification Search
CPC .. G11B 5/5552; G11B 5/4826; G11B 5/4873; G11B 5/4853; G11B 5/4833; G11B 5/596; G11B 5/56; G11B 5/482; G11B 5/486
USPC ............. 360/294.4, 294.3, 245.3, 245.1, 245, 360/264.3, 264.5
See application file for complete search history.

(56) References Cited

U.S. PATENT DOCUMENTS

| | | | |
|---|---|---|---|
| 5,608,590 A | 3/1997 | Ziegler et al. | |
| 5,657,188 A | 8/1997 | Jurgenson et al. | |
| 5,764,444 A | 6/1998 | Imamura et al. | |
| 6,108,175 A * | 8/2000 | Hawwa et al. | 360/294.4 |
| 6,246,552 B1 * | 6/2001 | Soeno et al. | 360/294.4 |
| 6,297,936 B1 * | 10/2001 | Kant et al. | 360/294.4 |
| 6,320,730 B1 * | 11/2001 | Stefansky et al. | 360/294.4 |
| 6,396,667 B1 * | 5/2002 | Zhang et al. | 360/294.3 |
| 6,493,192 B2 * | 12/2002 | Crane et al. | 360/294.3 |
| 6,549,376 B1 | 4/2003 | Scura et al. | |

(Continued)

OTHER PUBLICATIONS

U.S. Appl. No. 13/972,137, filed Aug. 21, 2013.

(Continued)

*Primary Examiner* — Brian Miller
(74) *Attorney, Agent, or Firm* — Faegre Baker Daniels LLP (57) ABSTRACT

Various embodiments concern a dual stage actuation suspension that comprises a loadbeam having a load point projection. The suspension further comprises a gimbal assembly having a point of contact that is in contact with the load point projection such that the gimbal assembly can gimbal about the load point projection. The gimbal assembly is cantilevered from the loadbeam and has an axis of rotation aligned with the load point projection and the point of contact. The suspension further comprises a pair of motors mounted on the gimbal assembly and positioned proximal of the point of contact. The pair of motors is mounted between a tongue and a pair of spring arms to rotate the tongue about the point of contact and the load point projection. The loadbeam further comprises a void into which the pair of motors extends.

20 Claims, 11 Drawing Sheets

(56) References Cited

U.S. PATENT DOCUMENTS

| | | | |
|---|---|---|---|
| 6,549,736 B2 | 4/2003 | Miyabe et al. | |
| 6,704,158 B2 | 3/2004 | Hawwa et al. | |
| 6,728,077 B1* | 4/2004 | Murphy | 360/294.4 |
| 6,735,055 B1 | 5/2004 | Crane et al. | |
| 6,751,062 B2 | 6/2004 | Kasajima et al. | |
| 6,760,196 B1 | 7/2004 | Niu et al. | |
| 6,771,466 B2 | 8/2004 | Kasajima et al. | |
| 6,771,467 B2 | 8/2004 | Kasajima et al. | |
| 6,898,042 B2* | 5/2005 | Subrahmanyan | 360/75 |
| 6,934,127 B2 | 8/2005 | Yao et al. | |
| 6,943,991 B2 | 9/2005 | Yao et al. | |
| 7,006,333 B1* | 2/2006 | Summers | 360/294.4 |
| 7,050,267 B2 | 5/2006 | Koh et al. | |
| 7,057,857 B1 | 6/2006 | Niu et al. | |
| 7,130,159 B2 | 10/2006 | Shimizu et al. | |
| 7,161,765 B2 | 1/2007 | Ichikawa et al. | |
| 7,256,968 B1 | 8/2007 | Krinke | |
| 7,345,851 B2* | 3/2008 | Hirano et al. | 360/294.4 |
| 7,379,274 B2* | 5/2008 | Yao et al. | 360/294.4 |
| 7,408,745 B2 | 8/2008 | Yao et al. | |
| 7,420,778 B2 | 9/2008 | Sassine et al. | |
| 7,466,520 B2* | 12/2008 | White et al. | 360/294.4 |
| 7,499,246 B2* | 3/2009 | Nakagawa | 360/294.4 |
| 7,768,746 B2* | 8/2010 | Yao et al. | 360/294.4 |
| 8,085,508 B2* | 12/2011 | Hatch | 360/294.4 |
| 8,089,728 B2 | 1/2012 | Yao et al. | |
| 8,125,741 B2 | 2/2012 | Shelor | |
| 8,194,359 B2 | 6/2012 | Yao et al. | |
| 8,259,416 B1 | 9/2012 | Davis et al. | |
| 8,289,652 B2* | 10/2012 | Zambri et al. | 360/234.5 |
| 8,295,012 B1 | 10/2012 | Tian et al. | |
| 8,300,362 B2 | 10/2012 | Virmani et al. | |
| 8,310,790 B1* | 11/2012 | Fanslau, Jr. | 360/294.4 |
| 2001/0013993 A1 | 8/2001 | Coon | |
| 2003/0011118 A1 | 1/2003 | Kasajima et al. | |
| 2003/0011936 A1 | 1/2003 | Himes et al. | |
| 2003/0210499 A1 | 11/2003 | Arya | |
| 2004/0125508 A1* | 7/2004 | Yang et al. | 360/294.3 |
| 2004/0207957 A1 | 10/2004 | Kasajima et al. | |
| 2005/0105217 A1* | 5/2005 | Kwon et al. | 360/245.3 |
| 2006/0193086 A1* | 8/2006 | Zhu et al. | 360/294.4 |
| 2006/0238924 A1* | 10/2006 | Gatzen | 360/294.4 |
| 2006/0274453 A1 | 12/2006 | Arya | |
| 2007/0223146 A1* | 9/2007 | Yao et al. | 360/294.4 |
| 2008/0144225 A1 | 6/2008 | Yao et al. | |
| 2008/0198511 A1* | 8/2008 | Hirano et al. | 360/294.4 |
| 2009/0244786 A1* | 10/2009 | Hatch | 360/294.4 |
| 2010/0067151 A1 | 3/2010 | Okaware et al. | |
| 2011/0096438 A1* | 4/2011 | Takada et al. | 360/244.2 |
| 2011/0242708 A1 | 10/2011 | Fuchino | |
| 2012/0002329 A1 | 1/2012 | Shum et al. | |
| 2012/0087041 A1 | 4/2012 | Ohsawa | |
| 2013/0020112 A1 | 1/2013 | Ohsawa | |
| 2013/0265674 A1* | 10/2013 | Fanslau | 360/245.3 |

OTHER PUBLICATIONS

U.S. Appl. No. 14/026,427, filed Sep. 13, 2013.
U.S. Appl. No. 14/050,660, filed Oct. 10, 2013.
U.S. Appl. No. 14/216,288, filed Sep. 14, 2012.
U.S. Appl. No. 14/467,582, filed Oct. 10, 2012.

* cited by examiner

CO-LOCATED GIMBAL-BASED DUAL STAGE ACTUATION DISK DRIVE SUSPENSIONS WITH OFFSET MOTORS

CROSS REFERENCE TO RELATED APPLICATION

This application is a continuation of U.S. Pat. No. 8,675,314, issuing on Mar. 18, 2014, the entirety of which is hereby incorporated by reference.

TECHNICAL FIELD

The present invention relates to disk drives and suspensions for disk drives. In particular, the invention is a dual stage actuation (DSA) suspension.

BACKGROUND

Dual stage actuation (DSA) disk drive head suspensions and disk drives incorporating DSA suspensions are generally known and commercially available. For example, DSA suspensions having an actuation structure on the baseplate or other mounting portion of the suspension, i.e., proximal to the spring or hinge region of the suspension, are described in the Okawara U.S. Patent Publication No. 2010/0067151, the Shum U.S. Patent Publication No. 2012/0002329, the Fuchino U.S. Patent Publication No. 2011/0242708 and the Imamura U.S. Pat. No. 5,764,444. DSA suspensions having actuation structures located on the loadbeam or gimbal portions of the suspension, i.e., distal to the spring or hinge region, are also known and disclosed, for example, in the Jurgenson U.S. Pat. No. 5,657,188, the Krinke U.S. Pat. No. 7,256,968 and the Yao U.S. Patent Publication No. 2008/0144225. Co-located gimbal-based DSA suspensions are disclosed in co-pending U.S. Provisional Application Nos. 61/700,972, 61/711,988, 61/738,167, and 61/826,865. All of the above-identified patents and patent applications are incorporated herein by reference in their entirety and for all purposes.

There remains a continuing need for improved DSA suspensions. DSA suspensions with enhanced performance capabilities are desired. The suspensions should be capable of being efficiently manufactured.

SUMMARY OF THE INVENTION

Various embodiments concern a dual stage actuation suspension that comprises a loadbeam having a load point projection. The suspension further comprises a gimbal assembly, the gimbal assembly having a point of contact that is in contact with the load point projection such that the gimbal assembly can gimbal about the load point projection. The gimbal assembly is cantilevered from the loadbeam and has an axis of rotation aligned with the load point projection and the point of contact. The suspension further comprises at least one motor mounted on the gimbal assembly and positioned proximal of the point of contact. The at least one motor can be mounted on, and bridge between, a spring arm and a tongue of the gimbal assembly. The at least one motor may extend into a void of the loadbeam. Further, a pair of struts may be aligned with the axis of rotation.

Various embodiments concern a dual stage actuation suspension that comprises a loadbeam having a load point projection. The suspension further comprises a gimbal assembly, the gimbal assembly cantilevered from the loadbeam and in contact with the load point projection at a point of contact on the gimbal assembly such that the gimbal assembly can gimbal about the load point projection. The gimbal assembly comprises a pair of spring arms that cantilever the gimbal assembly from the loadbeam, a tongue positioned between the pair of spring arms, and a pair of struts that respectively connect the pair of spring arms to the tongue. Both of the struts are oriented along an axis that intersects the point of contact. The suspension further comprises a pair of motors, the motors mounted on the tongue and respectively mounted on the pair of spring arms, each motor of the pair of motors located entirely proximal of the load point projection.

Various embodiments concern a dual stage actuation suspension that comprises a loadbeam. The loadbeam comprises a void. The suspension further comprises a gimbal assembly, the gimbal assembly cantilevered from the loadbeam. The suspension further comprises at least one motor mounted on the gimbal assembly, the at least one motor extending into the void in the loadbeam.

Various embodiments concern a dual stage actuation suspension that comprises a loadbeam that has a load point projection and a void. The suspension further comprises a gimbal assembly, the gimbal assembly cantilevered from the loadbeam and in contact with the load point projection at a point of contact on the gimbal assembly such that the gimbal assembly can gimbal about the load point projection. The gimbal assembly comprises a pair of spring arms that cantilever the gimbal assembly from the loadbeam, a tongue positioned between the pair of spring arms, and a pair of struts that respectively connect the pair of spring arms to the tongue. The suspension further comprises a pair of motors, the pair of motors mounted on the tongue and respectively mounted on the pair of spring arms. Each motor of the pair of motors is located entirely proximal of the load point projection. The pair of motors is configured to rotate the tongue relative to the pair of spring arms by electrical activation of the motors. The pair of motors projects from the gimbal assembly into the void of the loadbeam.

While multiple embodiments are disclosed, still other embodiments of the present invention will become apparent to those skilled in the art from the following detailed description, which shows and describes illustrative embodiments of this disclosure. Accordingly, the drawings and detailed description are to be regarded as illustrative in nature and not restrictive.

While the subject matter of this disclosure is amenable to various modifications and alternative forms, specific embodiments have been shown by way of example in the drawings and are described in detail below. The intention, however, is not to limit this disclosure to the particular embodiments described. On the contrary, this disclosure is intended to cover all modifications, equivalents, and alternatives falling within the scope of this disclosure as defined by the appended claims.

DESCRIPTION OF THE INVENTION

Figure 1:
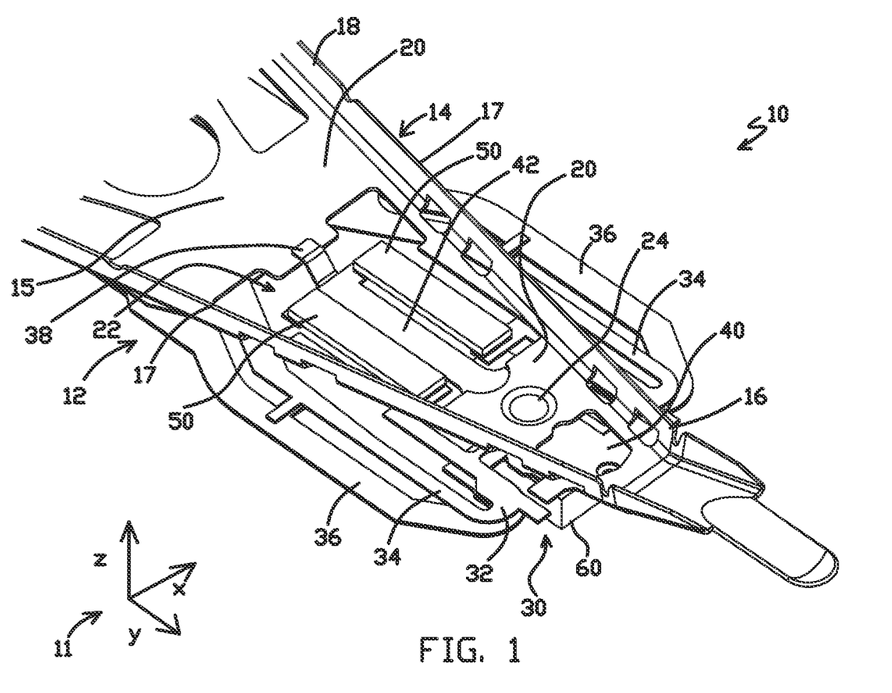
FIG. 1 is an isometric view a suspension in accordance with an embodiment of the invention.
Figure 2:
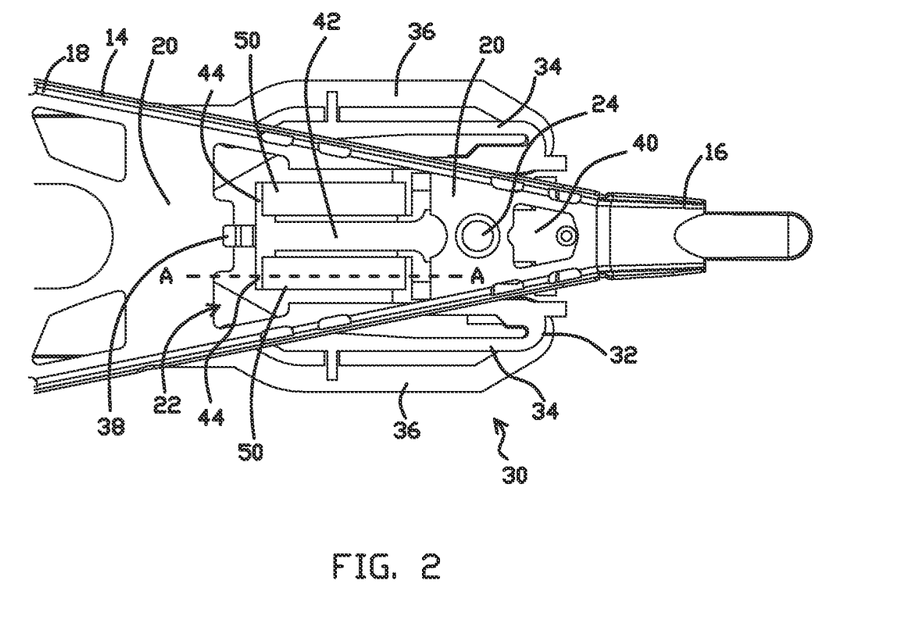
FIG. 2 is an overhead view of the suspension of FIG. 1.

FIG. 1 is an isometric view of a suspension 10 having a flexure with a co-located or gimbal-based dual stage actuation (DSA) structure in accordance with a first embodiment of the invention. Aspects of the suspension 10 will be described in relation to the X, Y, and Z axes 11. FIG. 2 shows an overhead view of the loadbeam-side of the suspension 10 along the X-Y plane. The suspension 10 includes a loadbeam 14. The loadbeam 14 includes a proximal end 18 and a distal end 16 (proximal and distal directions being along the Y axis). It will be understood that the loadbeam 14, as with the suspension 10 as a whole, is oriented lengthwise along a longitudinal axis (e.g., the Y axis) that extends proximally and distally. The proximal end 18 of the loadbeam 14 can be connected to a proximal mounting structure such as baseplate (not illustrated) that structurally supports the suspension 10 over a spinning disk containing read/writable media (not illustrated). The loadbeam 14 is a rigid structure that is formed from metal, such as stainless steel. The loadbeam 14 comprises a major planar portion 20. The major planar portion 20 can be a flat surface of the loadbeam 14. The major planar portion 20 can extend over a substantial majority of the footprint (e.g., along an X-Y plane) of the loadbeam 14. The major planar portion 20 can be divided into multiple sections by one or more voids, such as the void 22 in the major planar portion 20. The multiple sections, even though separated by the void 22, may still be co-planar and formed from a common metal sheet. The loadbeam 14 further comprises rails 17 on the lateral sides of the loadbeam 14. The loadbeam 14 further comprises a dimple 24. The dimple 24 can be formed from the substrate metal of the loadbeam 14 (e.g., within the major planar portion 20) by deformation of the substrate metal. The dimple 24 is a type of load point projection that contacts the gimbal assembly 30 and allows the gimbal assembly 30 to pitch and roll relative to the rest of the suspension 10 as further explained herein.

The suspension 10 includes a flexure 12 mounted on the loadbeam 14. The flexure 12 includes a gimbal assembly 30 on its distal end. The gimbal assembly 30 is structurally supported by a spring metal layer 32 as further described herein.

Figure 3:
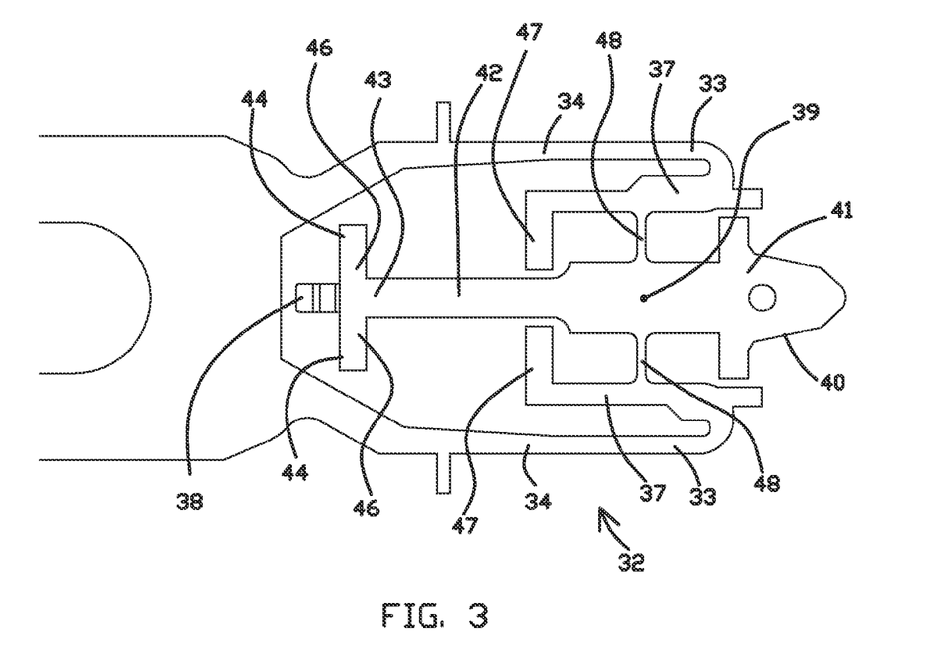
FIG. 3 is an overhead view of a spring metal layer isolated from the suspension of FIGS. 1-2.

FIG. 3 shows an overhead view of the spring metal layer 32 of the suspension 10 in isolation. The spring metal layer 32 can be attached to the loadbeam 14 along an attachment region 15, wherein the spring metal layer 32, as well as the rest of the gimbal assembly 30, can extend distally from the attachment region 15 as a cantilever. As mentioned previously, the gimbal assembly 30 can contact the dimple 24 distally of the attachment region 15 to allow the gimbal assembly 30 to pitch and roll about the dimple 24 or other type of load point projection. The gimbal assembly 30 is forced to engage with the dimple 24 by tension provided by the spring arms 34 which are part of the spring metal layer 32 and are likewise attached to the loadbeam 14 at the attachment region 15.

Figure 10:
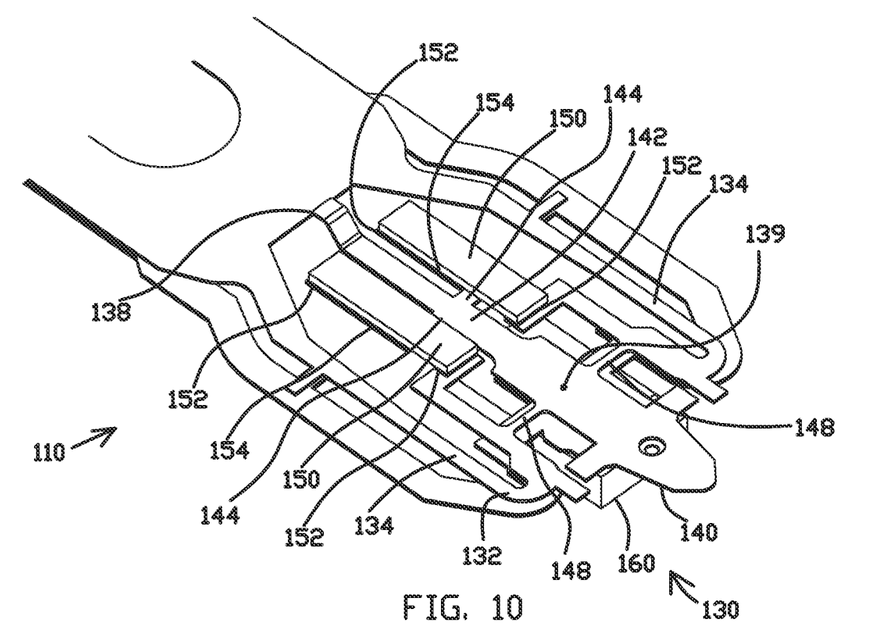
FIG. 10 is an isometric view of the gimbal assembly of a suspension in accordance with another embodiment of the invention.

The spring metal layer 32, which defines a tongue 40 of the gimbal assembly 30, is shown in FIG. 3. The tongue 40 is an elongated portion (elongated along the Y axis) that is located between the spring arms 34. As shown in FIG. 3, each of the spring arms 34 includes an outer arm portion 33 and an inner arm portion 37. Each outer arm portion 33 is continuous with a respective inner arm portion 37 via a distal bend in the spring arm 34. The tongue 40 includes a point of contact 39 which makes contact with the dimple 24. The tongue 40 further includes a neck 42 which connects a proximal portion 43 of the tongue 40 to a distal portion 41 of the tongue 40. The proximal portion 43 of the tongue 40 includes lateral branches 44. As shown, the lateral branches 44 branch laterally from the neck 42 such that the tongue 40 forms a "T" shape, although other shapes can be formed. For example, a "Y" shape is shown in FIG. 10.

The illustrated embodiment of the suspension 10 also includes a gimbal limiter 38 which extends proximally from the spring metal layer 32. The gimbal limiter 38 comprises a tab configured to engage the major planar portion 20 or other part of the loadbeam 14 to prevent relative displacement between the tongue 40 and the loadbeam 14 beyond a particular amount to prevent damage to the gimbal assembly 30 and/or other component during unusual accelerations of the suspension 10.

The tongue 40 is connected to the spring arms 34 via a pair of struts 48. Each strut 48 is a part of the spring metal layer 32 that is continuous between a respective one of the pair of spring arm 34 and the tongue 40. As shown in FIG. 3, the struts 48 are the only part of the spring metal layer 32 that directly connects the tongue 40 to the spring arms 34. The struts 48 are the two narrowest portions of the spring metal layer 32 (e.g., in the X-Y plane) and therefore are most likely to bend in the X-Y plane as compared to other sections of the tongue 40. Such bending rotates the tongue 40 about the point of contact 39. Each strut 48 has a longitudinal axis (parallel with the X axis). The longitudinal axis of each strut 48 is transverse (e.g., orthogonal) to the longitudinal axes of each of the tongue 40, the gimbal assembly 30, and the loadbeam 14 as well as of the suspension 10 as a whole (which are each parallel with the Y axis). Both struts 48 of the pair of struts 48 are aligned along the same longitudinal axis. The longitudinal axis of the struts 48 intersects the point of contact 39 of the tongue 40 (on the X-Y plane). Such alignment between the struts 48 and the point of contact 39, as well as with the dimple 24 which impinges on the point of contact 39, focuses relative motion between the spring arms 34 and the tongue 40 to rotate the tongue 40 about the point of contact 39 and the dimple 24, which will be further discussed herein.

A slider 60 is mounted to the tongue 40, opposite the loadbeam 14. The slider 60 accordingly moves with the tongue 40. The slider 60 contains one or more transducers for reading from and/or writing to the disk media. The slider 60 makes electrical connections with the conductors of the flexible circuit 36 for routing signals to and/or from the transducers of the slider 60.

The suspension 10 further includes a pair of motors 50 mounted on the gimbal assembly 30. Each of the motors 50 can be a piezoelectric element that articulates when a voltage is applied across the element to provide microactuations. Each motor 50 can contain an anode terminal on a first major side of the motor 50 and a cathode terminal on the opposite major side of the motor 50. A first electrical connection can be made between a circuit of flexible circuit 36 (further described herein) to the anode or cathode terminal of the motor 50 and a second electrical connection can be made between the spring metal layer 32 (e.g., as ground) and the other of the anode or cathode terminal of the motor 50.

Figure 4:
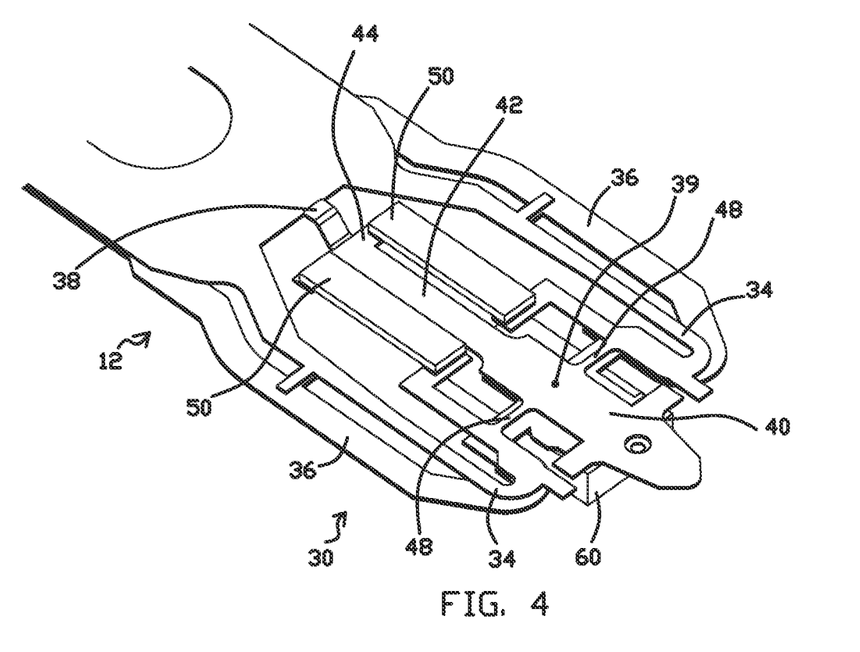
FIG. 4 is an isometric view of a gimbal assembly having a pair of motors mounted on the spring metal layer of the embodiment of FIG. 3

FIG. 4 is an isometric view of the suspension 10. More specifically, FIG. 4 shows the motors 50 mounted on the flexure 12. The motors 50 are attached to the gimbal assembly 30 by being mounted on proximal mounting areas 46 and distal mounting areas 47 of the spring metal layer 32. The proximal mounting areas 46 and the distal mounting areas 47 are shown in FIG. 3, which shows the spring metal layer 32 in isolation. The proximal mounting areas 46 are located on the lateral branches 44 of the tongue 40. The proximal ends of the motors 50 can be respectively attached to the proximal mounting areas 46. The distal mounting areas 47 are located on the inner arm portions 37 of the spring arms 34. The distal ends of the motors 50 can be respectively attached to the distal mounting areas 47. An adhesive 52 (shown in FIG. 9), such as non-conductive epoxy, is used to attach the motors 50 to the proximal mounting areas 46 and the distal mounting areas 47.

Each of the motors 50 has a longitudinal axis (e.g., along the Y axis). The motors 50 can shorten or lengthen, depending on the polarization of the voltage across the anode and cathode terminals, along their longitudinal axes when activated. The activation of the motors 50 can rotate the tongue 40 relative to the spring arms 34 and the remainder of the suspension 10. Being that the slider 60 is fixed to the tongue 40, the slider 60 will move with the tongue 40 to provide a fine tracking motion of the slider 60 over particular areas of the disk media.

The flexure 12 includes a flexible circuit 36 for routing signals along the suspension 10. The flexible circuit 36 includes one or more layers of dielectric material (e.g., polyamide) and one or more layers of conductive material (e.g., copper trace). The conductive material is routed along the flexure 12 as separate traces of different circuits within the flexible circuit 36. Preferably, the flexible circuit 36 provides as little mechanical support as possible (substantially less than the spring metal layer 32) and instead moves with the gimbal assembly 30 while the spring metal layer 32 provides most or all of the mechanical support between the tongue 40 and the spring arms 34.

Figure 5:
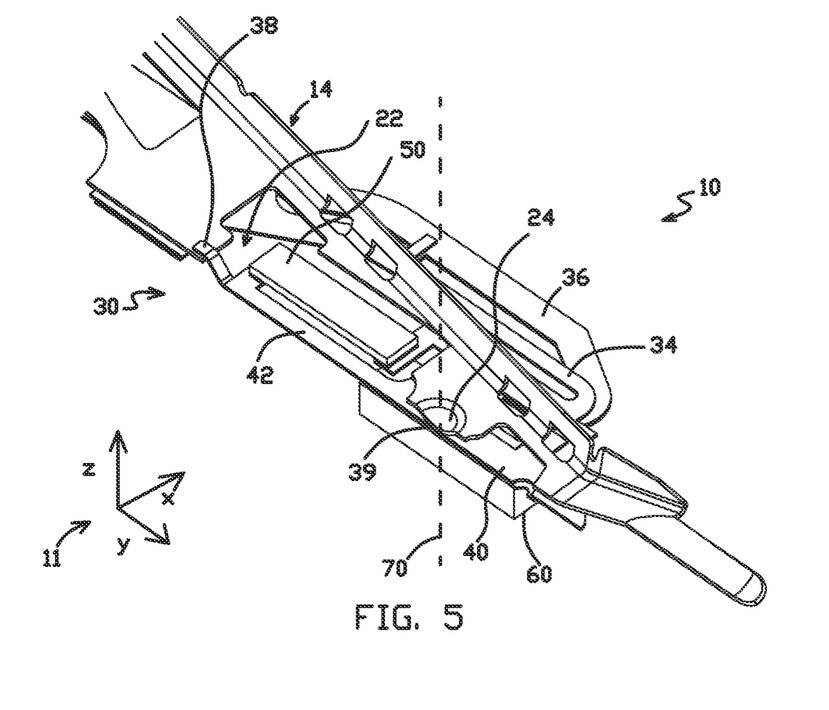
FIG. 5 is a cutaway view of the suspension of FIG. 1.

FIG. 5 is a cutaway isometric view of the suspension 10. Specifically, FIG. 5 shows a lateral side of the suspension 10 removed to better demonstrate the interaction between the gimbal assembly 30 and the loadbeam 14. As shown, an apex of the dimple 24 contacts the tongue 40 at the point of contact 39. FIG. 5 further shows that the axis of rotation 70 of the tongue 40 runs through the dimple 24 (e.g., at the apex of the dimple 24) and the point of contact 39. The axis of rotation 70 is along the Z axis and is orthogonal to the X-Y plane in which the tongue 40 rotates. The axis of rotation 70 is the instant center of rotation of the tongue 40, as further described herein.

Figure 6:
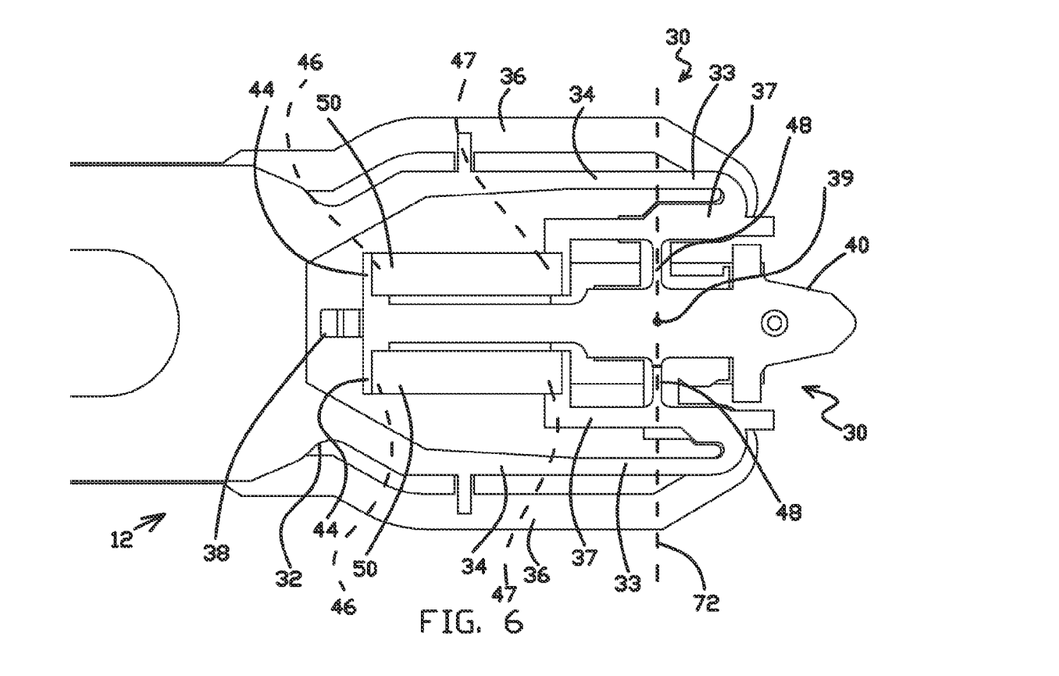
FIG. 6 is an overhead view of the pair of motors mounted on the spring metal later of the gimbal assembly of a suspension.

FIG. 6 shows an overhead view of the flexure 12 of the suspension 10. The overhead view shows that the point of contact 39 is directly between the struts 48. Specifically, both of the struts 48 are longitudinally aligned along an axis 72 that intersects the point of contact 39. The axis 72 extends along the X axis. Activation of the pair of motors 50, such that one of the motors 50 longitudinally contracts while the other expands, closes or widens the respective distance between the proximal mounting area 46 and the distal mounting area 47 (shown as exposed in FIG. 3) which moves the tongue 40 relative to the spring arms 34. The tongue 40 is rotated as a result of one of the motor 50 contracting while the other motor 50 expands, the motors 50 being laterally offset from the point of contact 39 on opposite sides of the point of contact 39 by the same distance. Furthermore, because of the positioning of the struts 48 and the struts 48 being configured to bend, the tongue 40 rotates about the point of contact 39, as further shown in FIGS. 6 and 7.

Figure 7:
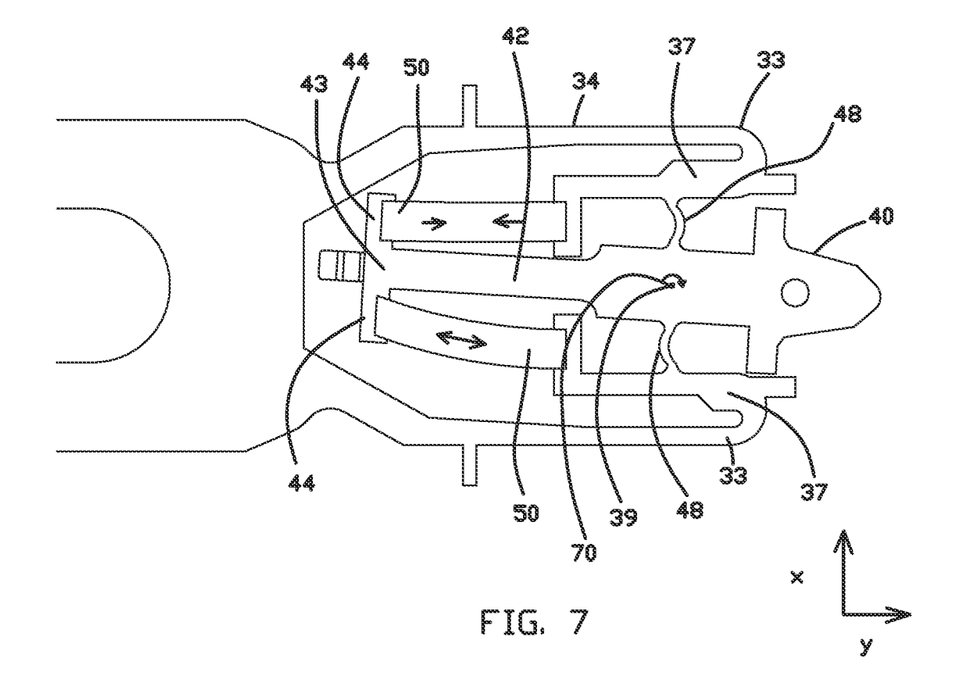
FIG. 7 is an overhead view of the pair of motors rotating a tongue of the spring metal later of the suspension in a first direction.
Figure 8:
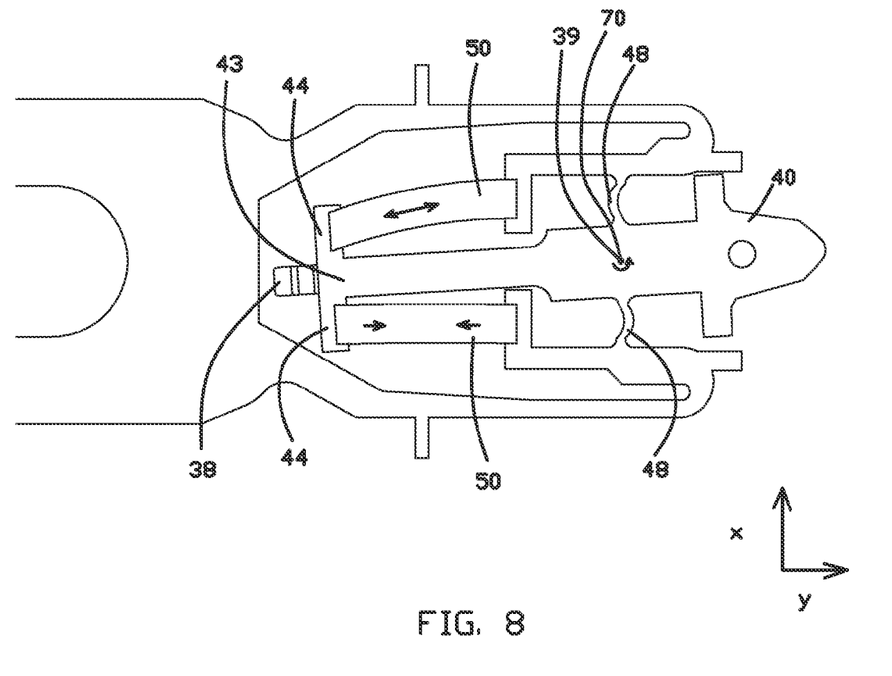
FIG. 8 is an overhead view of the pair of motors rotating a tongue of the spring metal later of the suspension in a second direction.

FIGS. 7 and 8 show an overhead view of two examples of part of the flexure 12 during rotation of the tongue 40. Specifically, FIGS. 7 and 8 show the spring metal layer 32, which includes the spring arms 34, struts 48, and tongue 40, and the motors 50 in isolation. As shown in FIG. 7, a first motor 50 of the pair of motors 50 contracts while a second motor 50 of the pair of motor 50 expands, which shifts the proximal portion 43 of the tongue 40 relative to the spring arms 34 while the spring arms 34 do not move, or do not substantially move, relative to the loadbeam 14 upon activation of the motors 50. As shown in FIG. 8, the first motor 50 expands while the second motor 50 contracts, which shifts the proximal portion 43 of the tongue 40 relative to the spring arms 34 in the opposite direction of the example shown in FIG. 7. The shifting of the proximal portion 43 of the tongue 40 rotates the tongue 40 about the point of contact 39 such that the axis of rotation 70 runs through (or is aligned with along the Z-Y plane) the point of contact 39. As shown, the tongue 40 rotates in the X-Y plane about the Z axis. It is noted that the axis of rotation 70 of the tongue 40 runs through (or is aligned with along the Z-Y plane) the dimple 24 (e.g., the apex of the dimple 24). It is noted that the axis of rotation 70 of the tongue 40 is located directly between the pair of struts 48 in the X-Y plane.

The axis of rotation 70 can be understood as the instant center of rotation of the tongue 40. The instant center of rotation refers to the point of the tongue 40 that has no velocity (i.e., does not laterally move in the X-Y plane) when the tongue 40 rotates in the X-Y plane. Centering the rotation of the tongue 40 as described above is facilitated by the alignment of the pair of struts 48. As shown, the two struts 48 bend in opposite directions upon activation of the motors 50. The struts 48 resist rotation while continuing to structurally support the tongue 40 during rotation such that the force from the shifting of the proximal portion 43 of the tongue 40 is focused between the struts 48.

Figure 9:
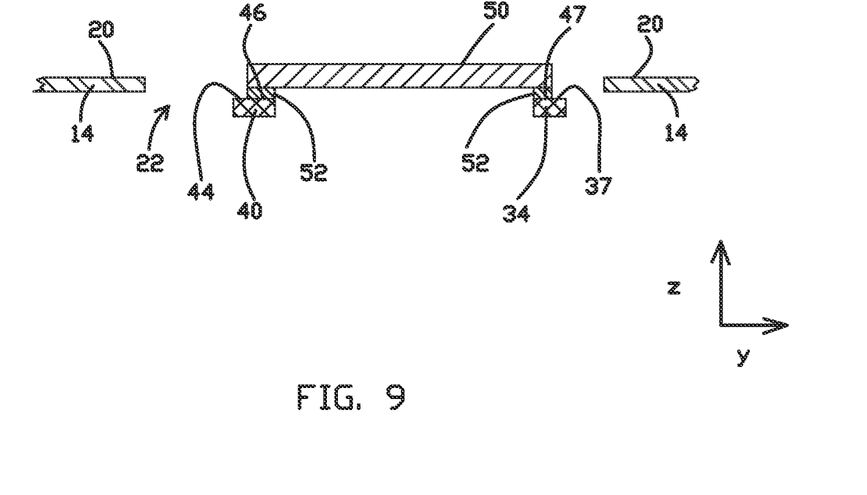
FIG. 9 is a cross-sectional view along line AA of the suspension of FIG. 2.

It is noted that the motors 50 are entirely proximal of each of the struts 48, the dimple 24, the point of contact 39, and the axis of rotation 70. Locating the motors 50 proximally in this manner reduces the height above the gimbal assembly 30 to minimize the height of the suspension 10. Alternatively, the motors 50 could be located along the proximal portion 43 of the tongue 40, but in such case a taller dimple 24 would be needed to create sufficient separation distance between the loadbeam 14 and the gimbal assembly 30. FIGS. 1 and 5 show that the motors 50 extend into and through the void 22 in the loadbeam 14. Specifically, the void 22 accommodates the motors 50 which are at least partially within the void 22 and further extend above the major planar portion 20 of the loadbeam 14. In some alternative embodiments, the motors 50 extend within the void 22 but above the loadbeam 14. FIG. 9 shows a cross-sectional view of the suspension 10 along line AA of FIG. 2. FIG. 9 shows the motor 50 mounted to the proximal mounting area 46 on the lateral branch 44 of the tongue 40 via adhesive 52 and to the distal mounting area 47 on the inner arm portion 37 of the spring arm 34. As shown in FIG. 9, the motor 50 is parallel and co-planar with the major planar portion 20 of the loadbeam 14. As shown, the motor 50 and the major planar portion 20 are orientated in parallel along the Y axis. It will be understood that each motor 50 of the pair of motors 50 extends within the void 22 and is parallel and co-planar with the major planar portion 20 in the manner shown in FIG. 9. As shown in FIG. 2, each of the length and the width of the void 22 (e.g., along the X-Y plane) is larger than the respective length and width of each motor 50 to accommodate the motors 22 within the void 22. 12. In this way, each motor 50 can be understood to have a first length and a first width while the void 22 has a second length and a second width, the first and second widths measured along the same axis (e.g., X axis) and the first and second lengths measured along the same axis (e.g., Y axis). Accordingly, the first length of the motor 50 is less than the second length of the void 22 and the first width of the motor 50 is less than the second width of the void 22. The motor 50 can be understood to comprise a proximal end and a distal end. Both of the proximal end and the distal end of the motor 50 extends through the void 22 and above the major planar portion 20 of the loadbeam 14.

The gimbal assembly 30 is mostly or entirely on a first side of the loadbeam 14 while the motors 50, mounted on the gimbal assembly 30 and extending though the void 22 in the loadbeam 14, are at least partially on a second side of the loadbeam 14 that is opposite the first side. More specifically, the spring metal layer 32 is entirely on a first side of the loadbeam 14 while the motors 50, mounted on the spring metal layer 32 and extending though the void 22 in the loadbeam 14, are at least partially on a second side of the loadbeam 14 that is opposite the first side.

The motors 50, in being accommodated within the void 22 of the loadbeam 14, allows the gimbal assembly 30 to be positioned closer to the loadbeam 14 to minimize the thickness of the suspension 10. For example, being that the motors 50 are positioned between spring metal layer 32 and the loadbeam 14, the space between the spring metal layer 32 and the loadbeam 14 can be minimized by allowing at least a top portion of each of the motors 50 to extend into the void 22 of the loadbeam 14.

Referring to FIG. 1, the gimbal assembly 30 can be assembled and attached to the loadbeam 14 along the attachment region 15 without the motors 50 being mounted on the gimbal assembly 30. After the gimbal assembly 30 is attached to the loadbeam 14, the motors 50 can then be lowered through the void 22 and then attached to the gimbal assembly 30. Specifically, after the gimbal assembly 30 is attached to the loadbeam 14 (e.g., by welding), the lower portions of the motors 50 can be introduced from above the major planar portion 20, moved below the major planar portion 20 and into the void 22, optionally moved below the loadbeam 14, and then placed on the proximal mounting area 46 and the distal mounting area 47 and attached to the proximal mounting area 46 and the distal mounting area 47. Such an assembly process can delay the attachment of the motors 50 to the suspension 10 until later in the assembly process, whereby earlier assembly and processing steps may potentially damage the delicate motors 50. It is noted that each of the length and width of the void 22 (e.g., along the X-Y plane) must be larger than the length and width of each motor 50 to accommodate the motors 50 being attached in this manner.

FIG. 10 shows an isometric view of part of a suspension 110. The suspension 110 can be identical to the suspension of FIGS. 1-9 except as otherwise provided. Any structure or feature discussed in connection with FIGS. 1-9 or otherwise provided herein can be applied to the embodiment of FIG. 10. A spring metal layer 132 of the suspension 110 is shown in isolation in the overhead view of FIG. 11. The structure and/or function of the spring metal layer 132, the spring arms 134, the struts 148, the distal portion of the tongue 140, the point of contact 139, the pair of motors 150, the adhesive 152, the loadbeam (not illustrated), and the slider 160, as well as any other elements illustrated or not illustrated, can be identical to that of the embodiment of FIGS. 1-9. The tongue 140 rotates about the point of contact 139, directly between the struts 148, as previously described herein. A dimple of a loadbeam can contact the gimbal assembly 130 at the point of contact 139 as referenced herein.

The spring metal layer 132 includes proximal mounting areas 146 and distal mounting areas 147 on which the motors 150 can be attached in any manner referenced herein. The spring metal layer 132, as well as the rest of the gimbal assembly 130, can be structurally and functionally identical to the gimbal assembly 30 of FIGS. 1-9 except that the proximal portion of the tongue 140 has a different configuration as compared to the tongue 40 of the suspension 10 of FIGS. 1-9, as further discussed herein. While the neck 42 and lateral branches 44 of the tongue 40 in FIGS. 1-9 forms a "T" shape (excluding the gimbal limiter 38), the neck 142 and lateral branches 144 of the tongue 140 in FIG. 10 forms a "Y" shape (excluding the gimbal limiter 138). The tongue 140 includes lateral branches 144 which branch from the neck 142 distally with respect to the lateral branches 44 of the embodiment of FIGS. 1-9 which branch from the proximal end of the neck 42. Being that the motors 150 are proximal of the point of contact 139, the struts 148, a dimple of a loadbeam (as otherwise described herein), and proximal of other components as shown, the more distal branching of the lateral branches 144 allows greater area of overlap between the motors 150 and the lateral branches 144.

Figure 11:
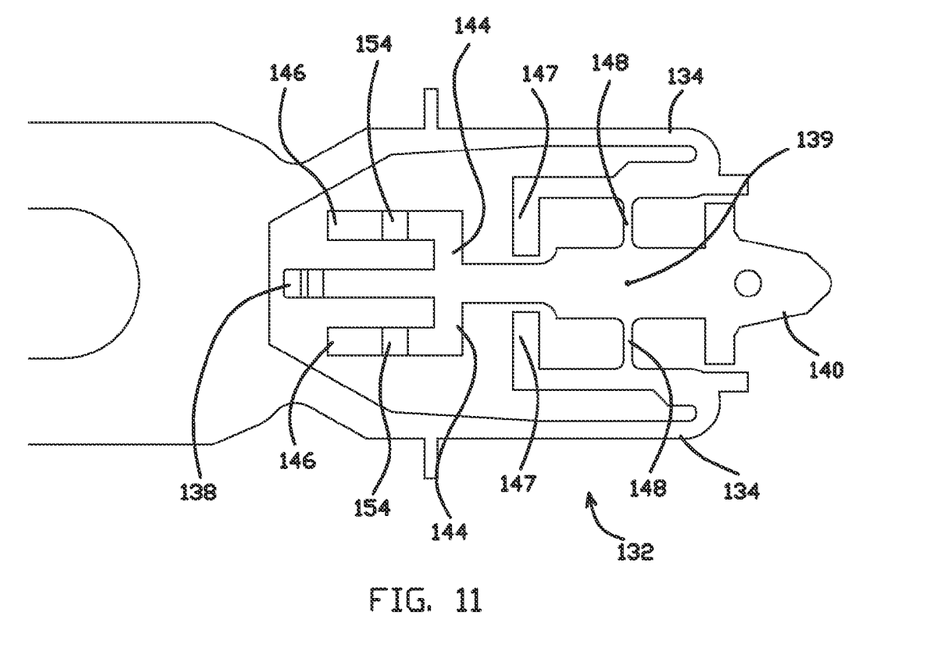
FIG. 11 is an overhead view of the spring metal layer of the embodiment of FIG. 10.

Dampers 154 are provided in the embodiment of FIGS. 10 and 11. The dampers 154 can inhibit vibrations within the gimbal assembly 130. As shown in FIG. 10, the motors 150 are mounted to the pair of spring arms 134 and the lateral branches 144, respectively. The dampers 154 are between each of the lateral branches 144 and the motors 150. The dampers 154 are further in contact with each of the lateral branches 144 and the motors 150. The dampers 154 can be adhesively attached to each of the lateral branches 144 and the motors 150.

Each damper 154 can be a layer of viscoelastic material, such as silicone or other polymer. The damper 154 material itself can be an adhesive material. The dampers 154 can dampen vibration or other movement between the motors 150 and the tongue 140. Each damper 154 is located at the longitudinal midpoint of a respective one of the motors 50. The longitudinal midpoint of the motor moves least, or not at all, as compared with the distal and proximal ends of the motor 150 because of the expanding and contracting movement of the motors 50. Damper material can additionally or alternatively be attached to the spring arms 134 such that they are between and contact each of the spring arms 134 and the motors 150 to dampen vibration or other movement between the spring arms 134 and the motors 150. In such case, the spring arms 134 may be formed to extend underneath the motors 150 to provide a mounting surface for the dampers.

While embodiments having a pair of motors have been shown herein, a different number of motors could alternatively be used on a suspension. For example, a single motor could be mounted on a spring arm and a tongue to rotate the tongue in any manner referenced herein. Further, a pair of struts may be aligned with an axis of rotation of the tongue, as described herein. The single motor may be positioned proximally of the axis of rotation, load point projection, and struts. The single motor may extend into a void of a loadbeam in any manner referenced herein.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above-described features.

The invention claimed is:

1. A dual stage actuation suspension, comprising:
   a loadbeam comprising a load point projection;
   a gimbal assembly, the gimbal assembly cantilevered from the loadbeam and in contact with the load point projection at a point of contact on the gimbal assembly such that the gimbal assembly can gimbal about the load point projection, the gimbal assembly comprising:
      a pair of spring arms that cantilever the gimbal assembly from the loadbeam, a pair of distal motor mounting areas respectively located on the pair of spring arms; and
      a tongue positioned between the pair of spring arms, a pair of proximal motor mounting areas respectively located on the tongue, each of the pair of proximal motor mounting areas located proximally along the gimbal assembly with respect to each of the pair of distal motor mounting areas; and
   a pair of motors, the pair of motors having proximal and distal ends, the proximal ends of the motors respectively mounted on the pair of proximal motor mounting areas, the distal ends of the motors respectively mounted on the pair of distal motor mounting areas, each motor of the pair of motors located entirely proximal of the load point projection.

2. The suspension of claim 1, wherein each spring arm comprises an outer arm portion, an inner arm portion, and a distal bend that connects the outer arm portion to the inner arm portion, and wherein the pair of distal motor mounting areas are respectively located on the an inner arm portions.

3. The suspension of claim 1, wherein the tongue comprises a proximal portion, a distal portion, a slider mounting on the distal portion, and a neck portion connecting the proximal portion to the distal portion.

4. The suspension of claim 3, wherein the proximal portion of the tongue comprises left and right lateral branches, and the pair of proximal motor mounting areas are respectively located on the left and right lateral branches.

5. The suspension of claim 4, wherein the neck and the left and right lateral branches for a T shape.

6. The suspension of claim 4, wherein the neck and the left and right lateral branches for a Y shape.

7. The suspension of claim 1, further comprising adhesive on each of the pair of distal motor mounting areas and the pair of proximal motor mounting areas, wherein the adhesive is attached to the proximal and the distal ends of each motor to bond the pair of motors to the gimbal assembly.

8. The suspension of claim 1, wherein the tongue is connected to the pair of spring arms by a pair of struts that respectively extend from the spring arms to the tongue.

9. The suspension of claim 8, wherein the tongue, the spring arms, and the pair of struts are all formed from a sheet of metal that structurally supports the gimbal assembly.

10. The suspension of claim 9, wherein the pair of struts are the only part of the sheet of metal that connects between the pair of spring arms and the tongue.

11. The suspension of claim 1, wherein the load point projection comprises a dimple.

12. The suspension claim 1, further comprising a slider mounted on the gimbal assembly.

13. The suspension claim 1, wherein the motors are oriented along a longitudinal axis of the suspension and in parallel with respect to each other.

14. The suspension of claim 1, wherein the motors are configured to rotate the tongue about an axis of rotation that extends through the tongue when the pair of motors is activated.

15. A dual stage actuation suspension, comprising:
   a loadbeam comprising a load point projection;
   a gimbal assembly, the gimbal assembly cantilevered from the loadbeam and in contact with the load point projection at a point of contact on the gimbal assembly such that the gimbal assembly can gimbal about the load point projection, the gimbal assembly comprising:
      a pair of spring arms that cantilever the gimbal assembly from the loadbeam, a pair of distal motor mounting areas respectively located on the pair of spring arms; and
      a tongue positioned between the pair of spring arms, the tongue comprising left and right lateral branches; and
   a pair of motors, the pair of motors having proximal and distal ends, the proximal ends of the motors respectively mounted on the left and right lateral branches of the tongue, the distal ends of the motors respectively mounted on the pair of spring arms, each motor of the pair of motors located entirely proximal of the load point projection.

16. The suspension of claim 15, wherein each spring arm comprises an outer arm portion, an inner arm portion, and a distal bend that connects the outer arm portion to the inner arm portion, and wherein the distal ends of the motors are respectively mounted on the inner arm portions.

17. The suspension of claim 15, wherein the tongue is connected to the pair of spring arms by a pair of struts that respectively extend from the spring arms to the tongue.

18. The suspension of claim 17, wherein the tongue, the spring arms, and the pair of struts are all formed from a sheet of metal that structurally supports the gimbal assembly.

19. The suspension of claim 17, wherein the pair of struts are the only part of the sheet of metal that connects between the pair of spring arms and the tongue.

20. A dual stage actuation suspension, comprising:
   a loadbeam;
   a gimbal assembly, the gimbal assembly cantilevered from the loadbeam and in contact with the loadbeam at a point of contact such that the gimbal assembly can gimbal about the load point projection, the gimbal assembly comprising:
      a pair of spring arms that cantilever the gimbal assembly from the loadbeam, a pair of distal motor mounting areas respectively located on the pair of spring arms; and
      a tongue, a pair of proximal motor mounting areas respectively located on left and right lateral branches of the tongue, each of the pair of proximal motor mounting areas located proximally along the gimbal assembly with respect to each of the pair of distal motor mounting areas; and
   a pair of motors, the pair of motors having proximal and distal ends, the proximal ends of the motors respectively mounted on the pair of proximal motor mounting areas, the distal ends of the motors respectively mounted on the pair of distal motor mounting areas, each motor of the pair of motors located entirely proximal of the load point projection.

* * * * *